(12) United States Patent
Crescenzo (10) Patent No.: US 12,336,558 B2
(45) Date of Patent: Jun. 24, 2025

(54) PEAR FEEDING METHOD AND APPARATUS FOR MULTI-LANE PROCESSING

(71) Applicant: Biagio Crescenzo, Salerno (IT)

(72) Inventor: Biagio Crescenzo, Salerno (IT)

( * ) Notice: Subject to any disclaimer, the term of this patent is extended or adjusted under 35 U.S.C. 154(b) by 815 days.

(21) Appl. No.: 17/632,309

(22) PCT Filed: Aug. 2, 2020

(86) PCT No.: PCT/IB2020/057305
§ 371 (c)(1),
(2) Date: Feb. 2, 2022

(87) PCT Pub. No.: WO2021/024147
PCT Pub. Date: Feb. 11, 2021

(65) Prior Publication Data
US 2022/0322723 A1    Oct. 13, 2022

(30) Foreign Application Priority Data

Aug. 5, 2019   (IT) .................. 102019000014079

(51) Int. Cl.
| | |
|---|---|
| *A23N 15/04* | (2006.01) |
| *B26D 1/00* | (2006.01) |
| *B26D 1/09* | (2006.01) |

(52) U.S. Cl.
CPC .............. *A23N 15/04* (2013.01); *B26D 1/09* (2013.01); *B26D 2001/0066* (2013.01)

(58) Field of Classification Search
CPC .......... A23N 4/14; A23N 7/026; B26D 7/088; A23L 19/03

USPC .......... 198/384, 385, 712; 99/635; 426/518, 426/481, 237, 326, 489, 615, 634

See application file for complete search history.

(56) References Cited

U.S. PATENT DOCUMENTS

| | | | |
|---|---|---|---|
| 2,742,067 A | 4/1956 | Coons et al. | |
| 3,246,677 A | 4/1966 | Hickey et al. | |
| 3,690,049 A * | 9/1972 | Roberson | ............... A01D 45/26 |
| | | | 171/61 |
| 4,487,307 A * | 12/1984 | Meissner | ................. A23N 4/14 |
| | | | 198/463.5 |
| 4,766,990 A | 8/1988 | Colombo | |

(Continued)

FOREIGN PATENT DOCUMENTS

WO        2002009538 A1    2/2002

*Primary Examiner* — Vy T Nguyen
(74) *Attorney, Agent, or Firm* — FISHERBROYLES, LLP; Roger L. Browdy; Ronni S. Jillions (57) ABSTRACT

A pear feeder for multi-lane processing has, on a frame (1), a shuffle feeder (2), a plurality of chutes (3), a plurality of feed channels (4), small belts (5) running on respective pairs of belt holder pulleys (9, 90) mounted on each feed channel (4) and moved by a motor (10) through a first transverse shaft (11) so as to be transmitted to the belts (5) a retrograde motion with respect to the pear advancement and allow each pear to continue advancing along its own advancement channel (4) with the stem downward up to the exit end, and a plurality of aligned jaws of reception (15) which can be opened simultaneously. On the frame (1) of the apparatus, in a position below the plurality of aligned receiving jaws (15), a cutting device (18) is mounted movably by means of a second pneumatic piston (19) on horizontal end guides (20).

14 Claims, 8 Drawing Sheets

(56) References Cited

U.S. PATENT DOCUMENTS 4,907,687 A 3/1990 Meissner et al.
5,435,238 A 7/1995 Paterson et al.

\* cited by examiner

PEAR FEEDING METHOD AND APPARATUS FOR MULTI-LANE PROCESSING

TECHNICAL FIELD

The present invention relates to a pear feeding method and apparatus for multi-lane processing. In particular, an apparatus is described for singularly feeding and orienting pears, cutting pear stems and send the pears to subsequent process, such as peeling, cutting or other. This subsequent process takes place in a part of a machine, in which the pears are kept with their longitudinal stem-corolla axis vertical or, respectively, horizontal, but this part does not regard the invention.

BACKGROUND ART

U.S. Pat. No. 3,246,677 describes a method and a machine for processing fruit, in particular pears, in which a shuffle feeder and subsequently a conveyor belt with multiple lanes is provided for advancing the pears to various processing stages. The shuffle feeder and the conveyor belt are connected to each other by a pair of endless chains that are trained around sprockets and are interconnected by a plurality of conveying buckets extending transversely between the chains. Each bucket has a pair of side walls converging inward from the chains to a bottom wall and an open top spaced outward from its associated bottom wall. Adjacent side walls of adjacent buckets are pivotally connected to each other and to the chains by hinges.

U.S. Pat. No. 4,907,687 describes a pear orienting apparatus for receiving, orienting and subsequently feeding oriented pears with the stem-end lowermost to peeling and coring devices including a shaker pan feeding singulated pears to at least one channeled lifter that tumbles the singulated pears over spaced divergent guide plates onto an inclined and intermittently gated delivery chute.

WO2002009538A1 describes a machine for processing pears in which there is a shuffle feeder for feeding the fruit to a robotic arm that picks up the pears individually, leading, inter alia, to a device of the machine in which each pear is placed horizontally for cutting the pear stem. A drawback of the machine described in WO2002009538A1, in addition to the individual removal of the stem one at a time, lies in the fact that the blade also removes part of the pear pulp.

A similar removal is foreseen in U.S. Pat. No. 2,742,067, which describes a machine for feeding pears, for removing the stem, for poking them at their ends and for cutting them in half. It includes a device that allows the longitudinal insertion and rotation of a stem equipped with knives in the calyx end of the pear to support it fixed and deprive it of seeds; a knife is mounted rotatable together with a bell that holds a tip portion of the pear. The stem is removed together with the tip portion of the pear.

U.S. Pat. No. 4,766,990 A describes a process of feeding pears for multi-lane processing, comprising the steps of supplying pears to a shuffle feeder and leading the pears singulated in a plurality of chutes in numbers equal to that of the processing lines.

SUMMARY OF THE INVENTION

Therefore, an object of the present invention is to allow, in a pear feeding device for multi-lane processing, the advancement of pears of different size to a stem cutting station.

Another object of the invention is to allow the multiple cutting of pear stems.

Another object of the invention is to allow the further advancement of the stem-free pears to subsequent processing steps such as their peeling.

The specified technical task and the specified purposes are substantially achieved by a process according to the attached claims 1 to 3, and by a pear feeding apparatus for multi-lane processing, comprising the technical features set out in claims 4 a 14.

BRIEF DESCRIPTION OF DRAWINGS

Further features and advantages of the present invention will become most clear from the indicative, and therefore non-limiting, description of a preferred but not exclusive embodiment of a pear feeding apparatus for multi-lane processing, as illustrated in the accompanying drawings, wherein.

DESCRIPTION OF AN EMBODIMENT OF THE INVENTION

Figure 1:
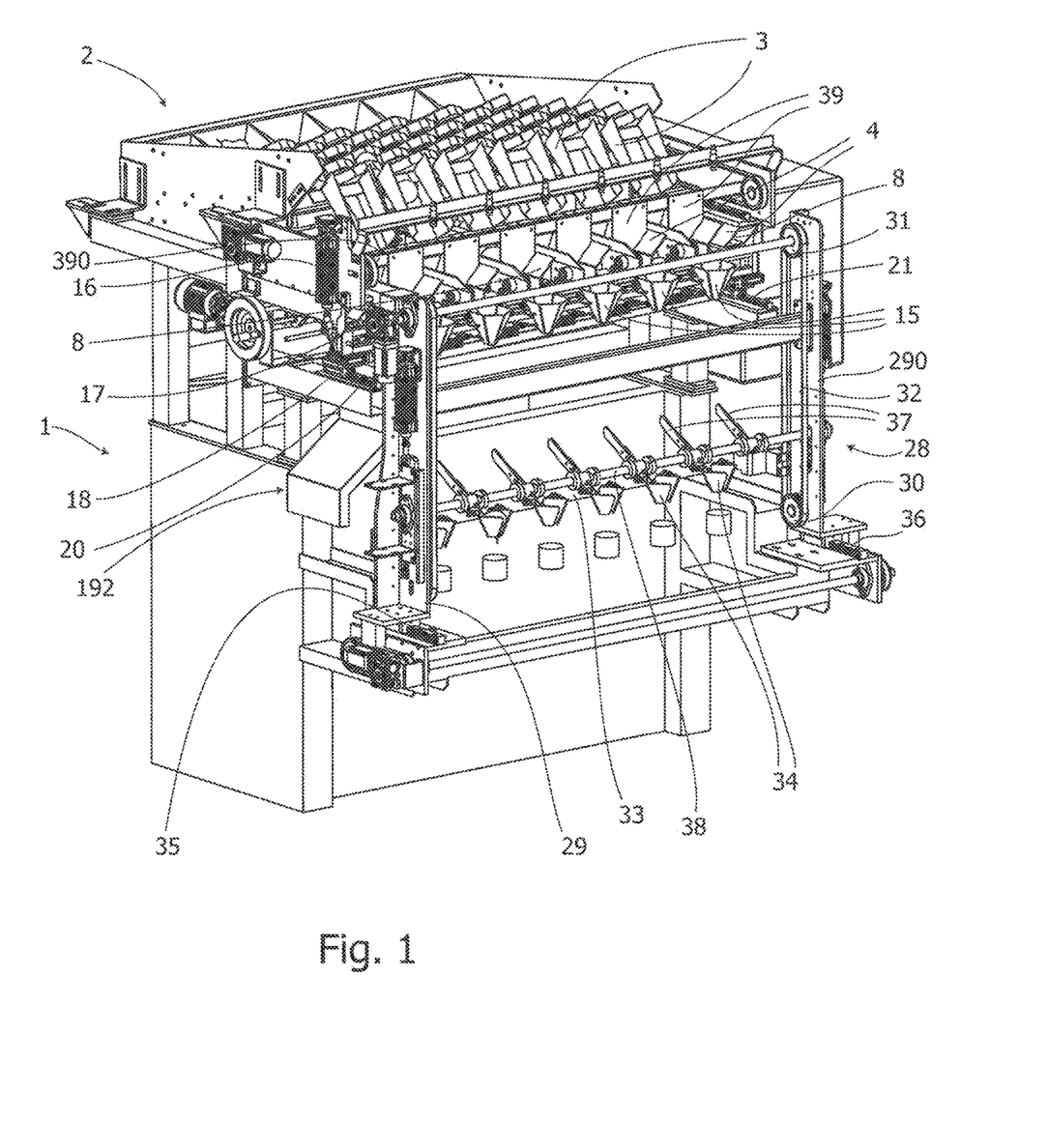
FIG. 1 is a perspective view of the pear feeding apparatus for multi-lane processing according to the present invention.
Figure 2:
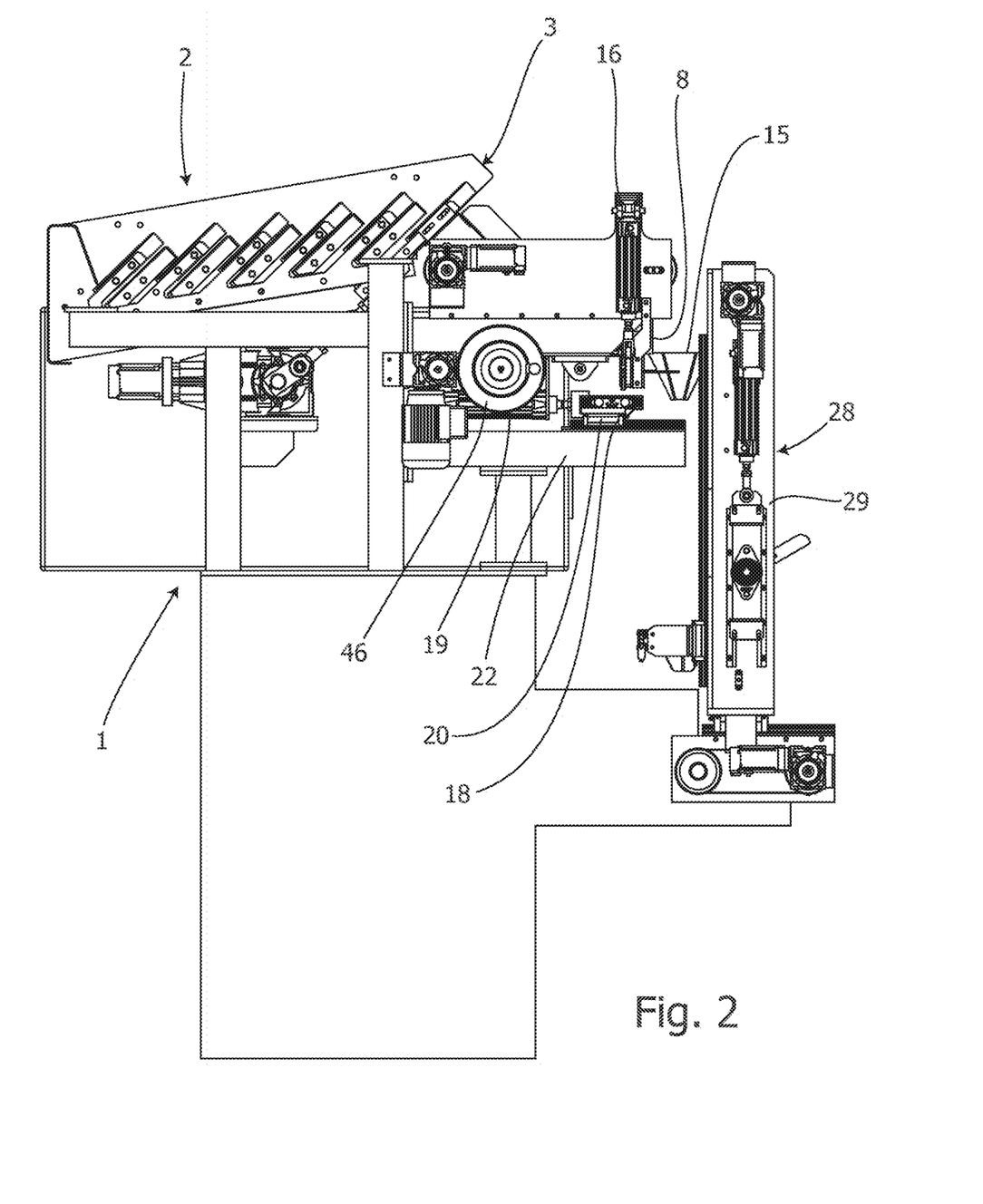
FIG. 2 is an enlarged side view of the apparatus in FIG. 1.

Referring to FIGS. 1 and 2, there is shown in a perspective view and in an enlarged side view, respectively, a pear feeding apparatus for multi-lane processing. FIG. 1 shows a six-lane processing apparatus that comprises a frame 1 shown in detail only for the part relating to the present invention. On the frame 1 there is a shuffle feeder 2 suitable for receiving pears entering the apparatus by means such as conveyor belts, trays or hoppers, not shown.

Downstream of the shuffle feeder 2 is a plurality of chutes, generally indicated as 3, in a number equal to that of the processing lanes of the apparatus. The chutes 3 are in continuity with the shuffle feeder 2, from which they singularly receive the pears.

Figure 3:
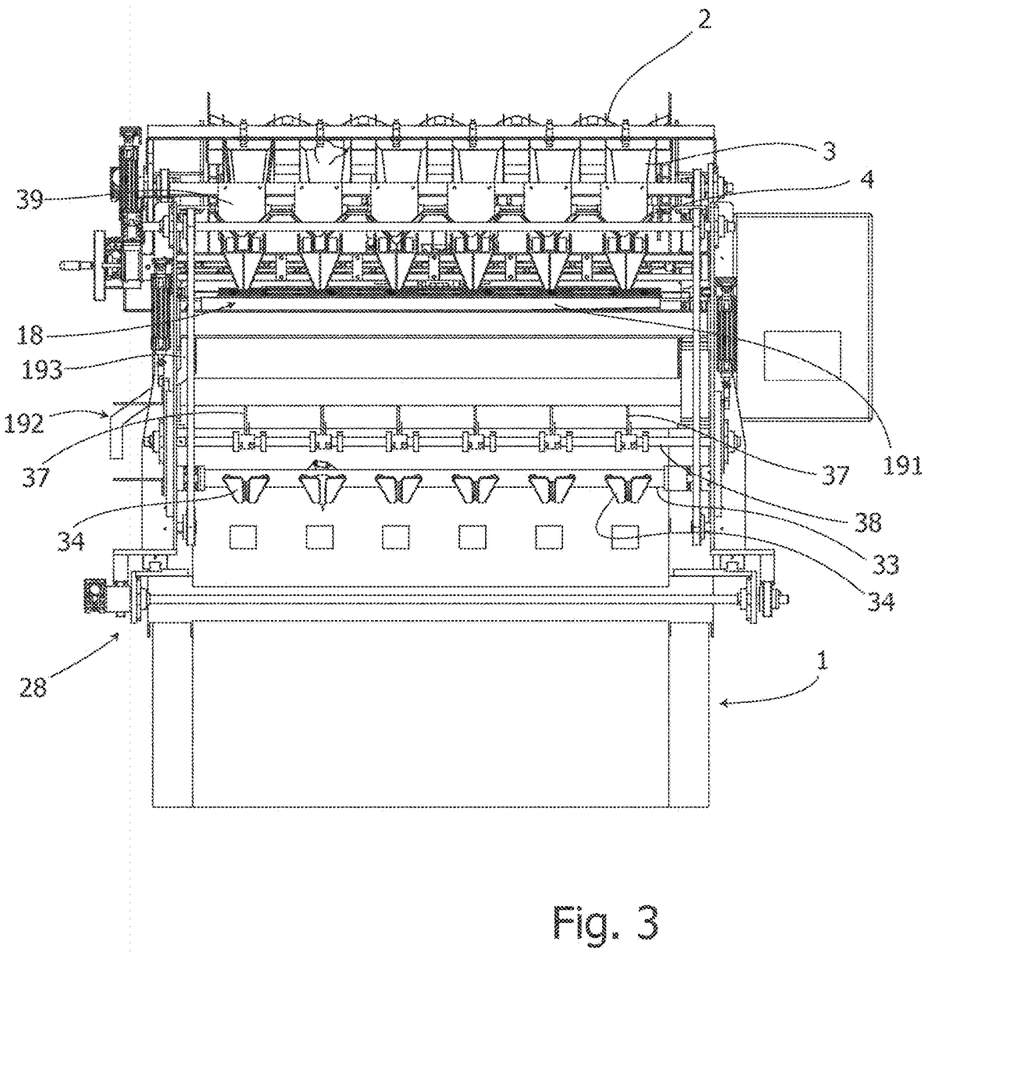
FIG. 3 is a front view of a variant of the apparatus in FIG. 1 with eight processing lanes instead of six.
Figure 4:
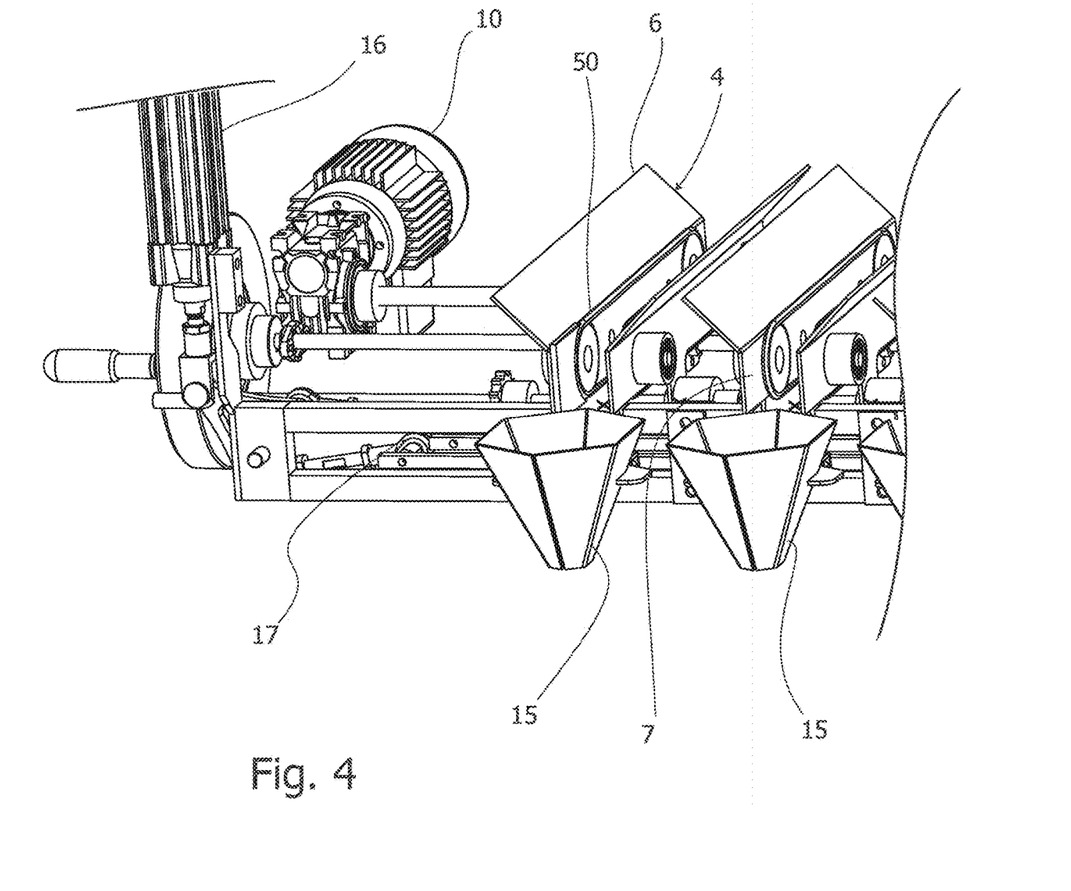
FIG. 4 is a perspective view on an enlarged scale of a detail in FIG. 3.
Figure 7:
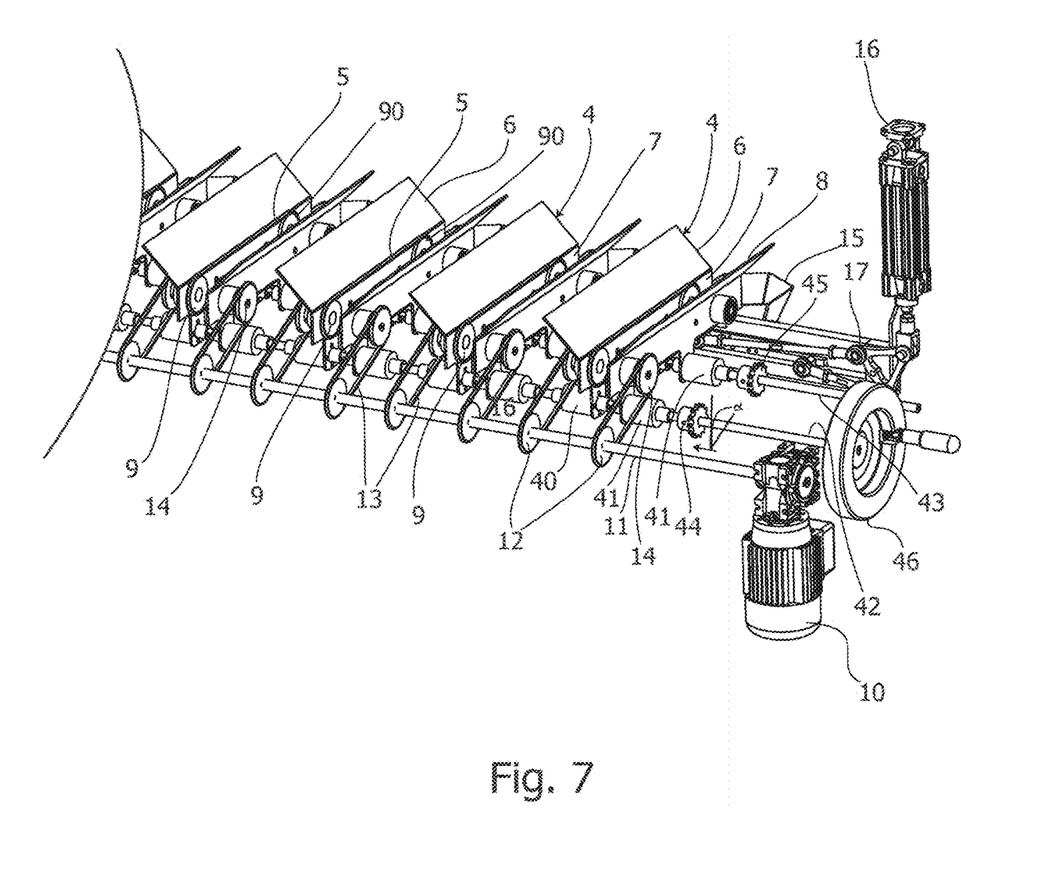
FIG. 7 is a partial perspective view of the feed channels, complete with small belts of the apparatus in FIGS. 1 and 2.
Figure 8:
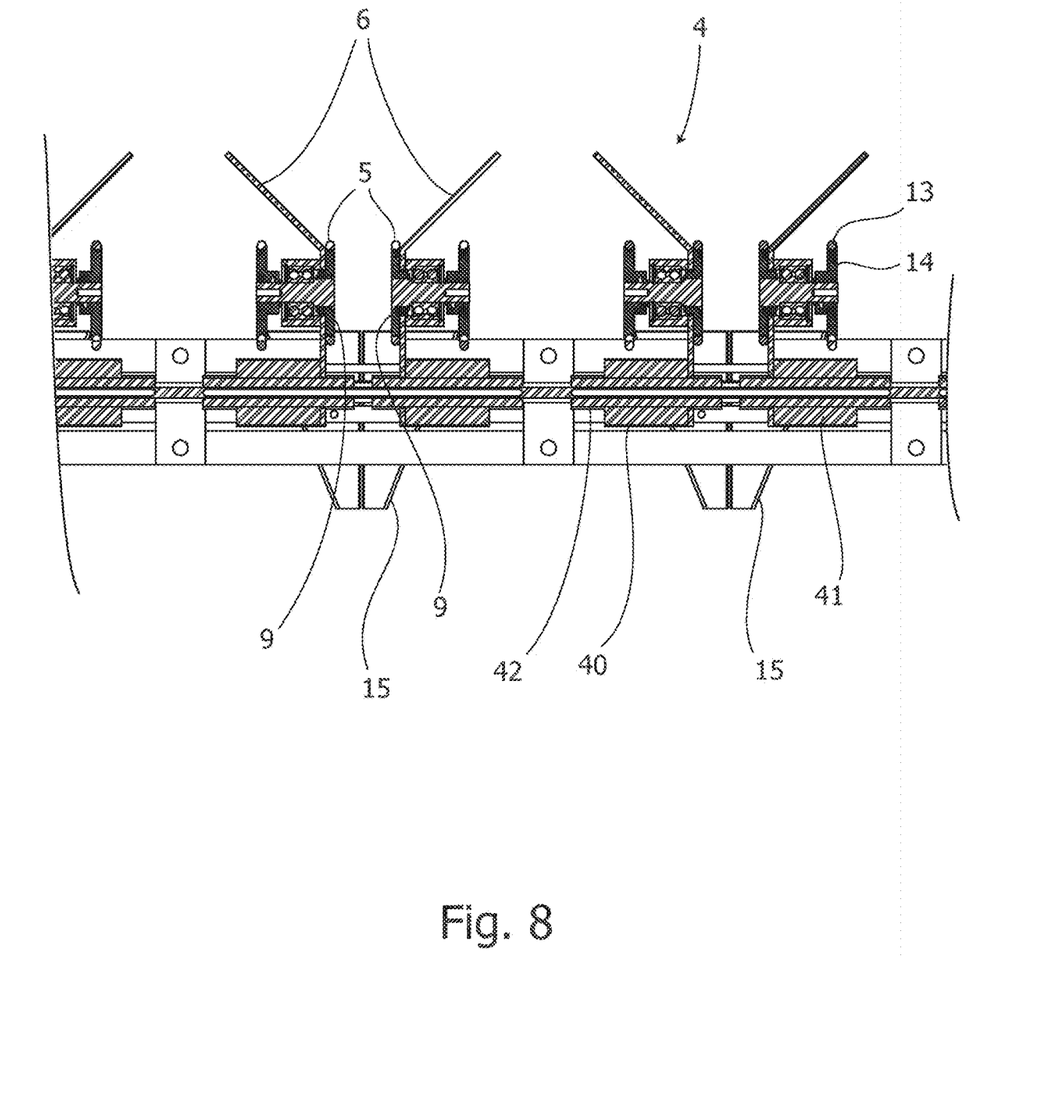
FIG. 8 is a partial central cross-section view obtained according to the plane a in FIG. 7.

Reference is made also to FIGS. 7 and 8, which are a partial perspective view of advancement channels 4, complete with small belts 5, and a partial central cross-section view, respectively, obtained according to the plane a in FIG. 7. The advancement channels 4, which are open at the bottom, are able to receive singularly pears (not shown) from the plurality of chutes. Each advancement channel 4 has facing sides and an exit end 8. Each advancement channel 4 has upper portions 6, which are preferably V-shaped converging downwards, and lower portions 7, which are mutually parallel. Therefore, each side has an upper portion 6 inclined downwards and a lower portion 7 that is vertical. In this way, pears are allowed to advance along the advancement channels 4 with their stem downwards, up to the channel exit end 8. The facing small belts 5 run on respective pairs of belt holder pulleys 9, 90 mounted on the lower portions 7 of the sides of each advancement channel 4. Each small belt 5 is tangent to the connection lane between the inclined upper portion 6 and the lower vertical portion 7 of the advancement channels 4 in order to avoid damage to the fruit and a detachment, if any, of the belts from the pulleys. For this purpose, the small belts 5 and the respective pulleys 14, mutually facing, are inserted in recesses 50 that are coplanar to the lower portions 7 of the sides so that pear stems do not fall between the sides and the small belts 5. This is shown in FIG. 4 which is a perspective view on an enlarged scale of a detail in FIG. 3, which is in turn a front view of a variant of the apparatus in FIG. 1 with eight processing lanes instead of six.

With reference to FIG. 7, a motor 10 has its own shaft connected to a first transverse shaft 11 on which a first plurality of pulleys 12 is keyed. The pulleys 12 are singularly connected by means of respective flexible transmission members 13 to a second plurality of pulleys 14 keyed together with respective belt holder pulleys 9 so as to transmit to the small belts 5 a retrograde motion with respect to the advancement of the pears. In this way, each pear is allowed to continue advancing along its own advancement channel 4 with the stem downward up to the exit end 8.

Each advancement channel 4 has inside a push device (not shown in detail) comprising a blade moved by a pneumatic cylinder capable of causing each pear to advance along its own advancement channel 4 up to the exit end 8.

A flexible barrier 39 is mounted on a horizontal bar 390 at each exit end 8 in the advancement channel 4 to reduce the speed of the pears.

A plurality of aligned receiving jaws 15 are adapted to hold each individual pear once gone out of its advancement channel 4. The receiving jaws 15 can be opened simultaneously by means of a first pneumatic piston 16 and a system of actuation rods 17, as shown in particular in FIGS. 4 and 7.

Figure 5:
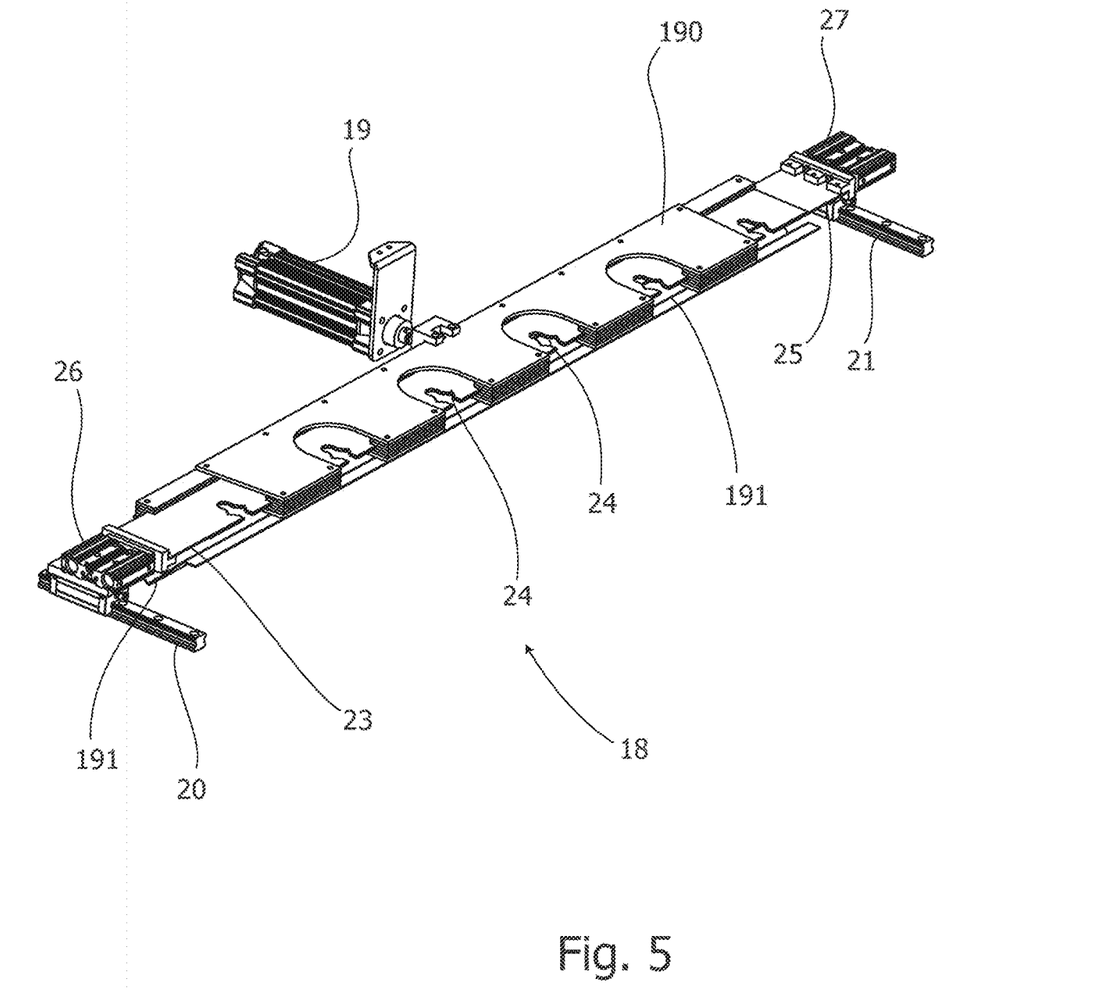
FIG. 5 is an enlarged perspective view from above of the cutting device shown in FIGS. 1 to 3.
Figure 6:
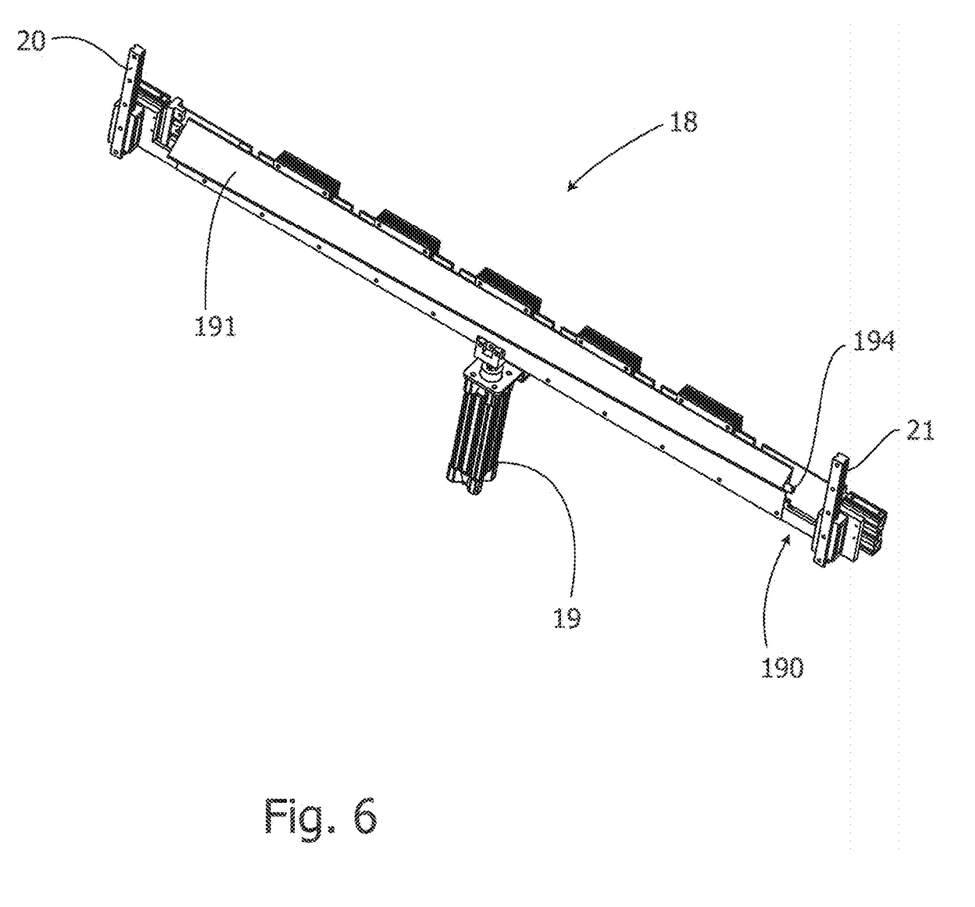
FIG. 6 is an enlarged perspective view from below of the cutting device shown in FIGS. 1 to 3.

Provided in a position below the plurality of aligned receiving jaws 15 is a cutting device 18 shown in the side view of FIG. 2, and in the front view of FIG. 3; the same cutting device 18 is shown in perspective view from above and below in FIGS. 5 and 6, respectively, separated from the rest of the apparatus. The cutting device 18 comprises a blade holder frame 190 mounted movably, by means of at least a second pneumatic piston 19, on horizontal end guides 20, 21. The horizontal end guides 20, 21 are fixed on a base 22 that is part of the frame 1 of the apparatus (FIG. 2). In the blade holder frame 190 there is at least one blade, but preferably two overlapping blades, the upper one 23, the lower one 25, slidable with respect to each other orthogonally to the horizontal end guides 20, 21 by means of opposite pistons 26, 27. The blades 23, 25 are equipped with shaped slots 24 intended to receive the pear stems singularly, following the forward movement of the blade holder frame 190 by the second pneumatic piston 19. The stems are cut by the blades 23, 25 while the pears are held with their tip facing downward, in the plurality of aligned receiving jaws 15 from the opposite movement of the blades 23, 25 by the opposite pistons 26, 27.

Inferiorly mounted rigidly to the blade holder frame 190 of the cutting device 18 is a collection and removal conduit 191 that is preferably V-shaped with a cross-section growing towards one side of the apparatus where a gutter channel 192 is provided. The cut stems fall into the collection and removal conduit 191 and they travel through it thanks to a jet of water sent through a tube 194 (FIG. 6) which enters the collection and removal conduit 191 on the opposite side to that of the gutter channel 192. It should be understood that the collection and removal conduit 191 is movable together with the frame 190, while the gutter channel 192 is fixed laterally to the base 22 of the frame 1. For this reason, the gutter 192 has a mouth 193 (FIGS. 1 and 3) with adequate dimensions in the longitudinal direction to receive the cut stems transported by the water also during the longitudinal movement of the cutting device 18 by the second pneumatic piston 19.

As shown schematically in FIGS. 1 and 2, the apparatus according to the present invention further comprises a transfer device generally indicated as 28 including uprights 29, 290 each carrying facing pulleys 30, 31 on which a flexible connection member 32 runs, such as a belt. A cup holder horizontal bar 33 is slidable on linear guides made in the uprights 29, 290. The flexible connection member 32 is connected to the cup holder horizontal bar 33 to transmit the motion to it. The transfer device 28 is shiftable horizontally in the longitudinal direction of the apparatus. In fact, the uprights 29, 290 are mounted movably on a pair of parallel orthogonal guides 35, 36. When the uprights 29, 290 are approached to the receiving jaws 15, the row of split transfer cups 34 carried by the cup holder bar 33 is positioned under the plurality of aligned receiving jaws 15 so that the split transfer cups 34 receive by gravity the pears when the receiving jaws 15 are opened. The cups 34 are flexible as well as being split, so as to allow the exit of a pear arriving from the receiving jaws 15, after applying a downward thrust on it. Then the cups 34 move away from the receiving jaws 15 thanks to the displacement of the transfer device 28 in the longitudinal direction of the apparatus on the pair of orthogonal parallel guides 35, 36.

A plurality of levers 37 mounted on a tube 38 is rotatably mounted to move downwardly the pears received in the split transfer cups 34.

Referring to FIG. 8, it is shown that the sides of each advancement channel 4 are mounted mutually movable by means of respective screw-nut screw couplings 40, 41 provided on at least a second transverse shaft 42. The second transverse shaft 42 can be operated to modify the mutual distance of the sides of each advancement channel 4.

Preferably, as shown in FIG. 7, the sides of each advancement channel 4 are mounted mutually movable by means of respective screw-nut screw couplings 40, 41 provided on two third transverse shafts 42, 43 mutually connected with transmission members (not shown) by means of gear wheels 44, 45. One of the third transverse shafts, the one indicated with 42, can be operated to modify the mutual distance of the sides of each advancement channel of the plurality of advancement channels.

Preferably, the actuation is of the manual type by means of a handwheel 46 to modify and fix the distance between the sides of the feed channels according to the size of the pears.

Thanks to the coupling via toothed wheels 44, 45 and connections between the two third trees 42, 43, the same shifting of the sides is obtained which would be complicated if made with a single shaft 42, given the length of the sides.

It should be understood that the apparatus according to the present invention achieves the set goals.

It allows the singulated advancement of pears of different size to a stem cutting station, the multiple cutting of pear stems, the further advancement of pears without stem to subsequent processing steps such as their peeling and cutting.

The apparatus is suitable for use in machines for processing pears that work horizontally and vertically, the fruits being generally with their stem-corolla axis arranged vertically and, respectively, horizontally.

The invention claimed is:

1. A pear feeding method for multi-lane processing, comprising steps of:
supplying pears to a shuffle feeder,
singularly moving the pears in a plurality of chutes in a number equal to that of the multi-lane processing,
advancing the pears with their stem pointing downwards in a plurality of advancement channels (4) that are open downwards up to an exit end of the advancement channels (4), against a retrograde motion of facing small belts by pushing elements,
retaining each pear exiting out of its advancement channel in a respective receiving jaw of a plurality of receiving jaws, and
simultaneously cutting pear stems by a cutting device, while the pears are retained inside the plurality of receiving jaws.

2. The method according to claim 1, further comprising a step of collecting by gravity cut stems and removing them in a collection and removal conduit that is under the cutting device and is supplied with water for allowing the cut stems to advance along a gutter.

3. The method according to claim 1, further comprising a step of pear vertical transfer by a plurality of split transfer cups of a transfer device horizontally shiftable for positioning the split transfer cups under the plurality of aligned receiving jaws so that the split transfer cups receive by gravity the pears when the aligned receiving jaws are opened.

4. A pear feeding apparatus for multi-lane processing, comprising on a frame:
a shuffle feeder suitable to receive the pears to be processed,
a plurality of chutes in a number equal to that of the multi-lane processing, the chutes being adapted to receive singularly the pears from the shuffle feeder,
a plurality of advancement channels, which are open downwards and able to receive singularly the pears from the chutes, each advancement channel having facing sides singularly comprised of a downwardly inclined upper portion and a lower portion, that is vertical, in such a way as to allow the pears to advance along the advancement channels with their stem pointing downwards up to an exit end of the advancement channels,
a pushing member in each advancement channel,
small belts that are facing each other and running on respective pairs of belt holder pulleys mounted on the lower portions of the sides of each advancement channel,
a motor having its own shaft connected to a first transverse shaft on which a first plurality of pulleys is keyed that are singularly connected by respective flexible transmission members to a second plurality of pulleys keyed together with respective belt holder pulleys so as to transmit to the small belts a retrograde motion with respect to the advancement of the pears and to allow each pear to continue to advance along its own advancement channel (4) with its stem downwards up to the exit end,
a plurality of aligned receiving jaws able to hold each single pear out of its advancement channel, the aligned receiving jaws being openable simultaneously by means of a first pneumatic piston and a system of drive rods, and
a cutting device is mounted on the frame of the apparatus, in a position below the plurality of aligned receiving jaws, the cutting device being movable on horizontal end guides in order to cut simultaneously the stems of the pears inside the aligned receiving jaws.

5. The apparatus according to claim 4, wherein the cutting device comprises a blade holder frame holding at least one blade and movably mounted by means of at least a second pneumatic piston, on the horizontal end guides fastened on a base in the frame of the apparatus.

6. The apparatus according to claim 4, wherein overlapping in the blade holder frame of the cutting device are an upper blade and a lower blade, the blades being slidable with respect to each other orthogonally to the horizontal end guides, by opposite pistons, the upper and lower blade being provided with shaped slots designed to singularly receive the pear stem thanks to the displacement ahead of the blade holder frame by the second pneumatic piston.

7. The apparatus according to claim 4, wherein the cutting device comprises a collection and removal conduit that is suitable for collecting and removing cut stems and is rigidly connected under the frame of the cutting device, and a small pipe adapted to supply water in the collection and removal conduit at one end thereof.

8. The apparatus according to claim 7, wherein the underlying conduit is V-shaped with a cross-section increasing towards one side of the apparatus, in which a gutter is provided that is fixed to the frame of the apparatus and equipped with a mouth adapted to receive the cut stems together with the water supplied by the small pipe, located in the side of the apparatus opposite to that in which the gutter is.

9. The apparatus according to claim 4, wherein the small belts together with the respective pairs of belt holder pulleys are inserted in recesses coplanar to the lower portions of the sides of each advancement channel so that the pear stems do not fall between the sides and the small belts.

10. The apparatus according to claim 4, further comprising a transfer device including a plurality of split transfer cups carried by flexible connecting members running on pairs of end pulleys arranged vertically in the transfer device, a pair of pulleys being driving, the transfer device being horizontally shiftable on a pair of parallel orthogonal guides to position the split transfer cups under the plurality of aligned receiving jaws so that the split transfer cups receive the pears by gravity when the receiving jaws are opened by the system of drive rods.

11. The apparatus according to claim 4, wherein a flexible barrier is mounted in each exit end of advancement channel for slowing down the advancing pears.

12. The apparatus according to claim 4, wherein the sides of each advancement channel are mounted mutually movable by means of respective screw-nut screw couplings provided on a second transverse shaft which is operated to modify the mutual distance of the sides of each advancement channel.

13. The apparatus according to claim 4, wherein the sides of each advancement channel are mounted mutually movable by respective screw-nut screw couplings provided on two third transverse shafts mutually connected with organs of transmission, one of the third transverse shafts being adapted to be operated in order to modify the mutual distance of the sides of each advancement channel.

14. The apparatus according to claim 12, wherein the second transverse shaft and one of the third transverse shafts are adapted to be operated manually by means of a handwheel in order to modify and set the distance between the sides of the advancement channels based on pear size.

\* \* \* \* \*